United States Patent
Lin et al.

(10) Patent No.: US 12,241,022 B2
(45) Date of Patent: Mar. 4, 2025

(54) METHOD FOR MAKING NANO- AND MICRO-PARTICLES FOR USE AS A PROPPANT AND FLUID-LOSS-CONTROL ADDITIVE

(71) Applicants: CNPC USA Corporation, Houston, TX (US); Beijing Huamei, Inc., Beijing (CN); China National Petroleum Corporation, Beijing (CN)

(72) Inventors: Lijun Lin, Katy, TX (US); Jiangshui Huang, Sugar Land, TX (US); Fuchen Liu, Panjin (CN); Lulu Song, Sugar Land, TX (US); Zhenzhou Yang, Beijing (CN); Yu Liu, Beijing (CN); Hanxiao Wang, Beijing (CN)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

(21) Appl. No.: 17/957,364

(22) Filed: Sep. 30, 2022

(65) Prior Publication Data
US 2023/0029914 A1 Feb. 2, 2023

Related U.S. Application Data

(63) Continuation-in-part of application No. 16/240,597, filed on Jan. 4, 2019, now Pat. No. 11,459,502.

(51) Int. Cl.
*E21B 43/34* (2006.01)
*C09K 8/80* (2006.01)
*C09K 109/00* (2006.01)

(52) U.S. Cl.
CPC ............ *C09K 8/80* (2013.01); *C09K 2109/00* (2013.01); *C09K 2208/10* (2013.01)

(58) Field of Classification Search
CPC .................................. C09K 8/80; E21B 43/34
USPC ...................................................... 166/280.2
See application file for complete search history.

(56) References Cited

U.S. PATENT DOCUMENTS

| | | | |
|---|---|---|---|
| 9,828,543 B2 * | 11/2017 | Chang | ............ C09K 8/602 |
| 9,834,721 B2 | 12/2017 | Chang | |
| 9,896,619 B2 * | 2/2018 | Nguyen | ............ C09K 8/80 |
| 10,060,244 B2 | 8/2018 | Nguyen | |

(Continued)

OTHER PUBLICATIONS

International Search Report and Written Opinion mailed Feb. 9, 2023 in corresponding PCT Application No. PCT/US22/46499.

(Continued)

*Primary Examiner* — Zakiya W Bates
*Assistant Examiner* — Ashish K Varma
(74) *Attorney, Agent, or Firm* — Hogan Lovells US LLP

(57) ABSTRACT

Nano- and micro-particles (NMP) can be formed from an oil/water emulsion. The emulsion is made by mixing a liquid solvent, at least one surfactant, a particle-forming compound, and at least curing agent. If desired, pH control agents and viscosity enhancers can be added to the liquid solvent. The particle-forming compound and the curing agents are mixed together and form the oil phase in the emulsion and after curing, the particles are formed. The nano- and micro-particles can be used as proppant to enhance the conductivity of nano- and microfractures and fluid-loss-control additive for hydraulic fracturing operations.

10 Claims, 9 Drawing Sheets

(56) References Cited

U.S. PATENT DOCUMENTS

| | | |
|---|---|---|
| 2015/0038344 A1 | 2/2015 | Pollack |
| 2016/0137910 A1 | 5/2016 | Chang |
| 2016/0289543 A1* | 10/2016 | Chang .................. C09K 8/602 |
| 2016/0304770 A1* | 10/2016 | Nguyen .................. C09K 8/92 |
| 2016/0355727 A1* | 12/2016 | Barati Ghahfarokhi ..................... C09K 8/80 |
| 2017/0145169 A1 | 5/2017 | Oakey |
| 2017/0292062 A1 | 10/2017 | Wylde |
| 2018/0010435 A1 | 1/2018 | Nguyen |
| 2020/0207932 A1 | 7/2020 | Purcell |
| 2020/0216750 A1 | 7/2020 | Lin |
| 2020/0369952 A1 | 11/2020 | Lin |

OTHER PUBLICATIONS

Chang, F. et al., "In-Situ Formation of Proppant and Highly Permeable Blocks for Hydraulic Fracturing," Society of Petroleum Engineers, Hydraulic Fracturing Technology Conference, The Woodlands, Texas, Feb. 3, 2015, SPE-173328-MS, 11 pages.

* cited by examiner

METHOD FOR MAKING NANO- AND MICRO-PARTICLES FOR USE AS A PROPPANT AND FLUID-LOSS-CONTROL ADDITIVE

FIELD

This disclosure relates generally to nano- and micro-particles and specifically to methods for making and using nano- and micro-particles as proppants and fluid-loss control additives for hydraulic fracturing operations.

BACKGROUND

Hydraulic fracturing has been an important technique to enhance production of hydrocarbons from oil and gas bearing formations. In typical hydraulic fracturing treatment, hydraulic fracturing fluid containing a solid proppant and a proppant-carrying liquid, such as linear gels and slick water, is injected into the formation at a pressure high enough to cause or enlarge a fracture in the reservoir. When the hydraulic fracturing fluid is removed, packed proppant can keep the fracture open, allowing fluids to flow from the formation through the fracture to the production wellbore. The proppant is of extreme importance as it provides for the long-term conductivity of the fracture.

Formation damage may be caused by fracturing fluid leak-off into reservoirs during and after hydraulic fracturing operations. U.S. Publ. No. 2016/0355727 to R. Barati discloses a method of using nanoparticles having an average diameter of less than 1 μm, comprising silicon oxide, calcium oxide, aluminum oxide, and made of fly ash from power plants as fluid loss minimizing additives. The nanoparticles are dispersed in a fracturing fluid made of 2% KCl with the addition of crosslinked guar, leading to the formation a uniform filter cake which apparently reduces the fluid loss.

Nano- and micro-fractures may close after hydraulic fracturing operation because conventional proppants are mainly applied to keep the main fractures open. To enhance the production of hydrocarbons, U.S. Publ. No. 2016/0304770 and U.S. Pat. No. 9,896,619 to P. Nguyen et al. used microproppants including silica flour and ceramic microproppants to largely increase the conductivity of microfractures.

Nano- and micro-particles have been applied as proppants and fluid-loss control additives for hydraulic fracturing operations. Nano- and micro-proppants promote the conductivity of nano- and micro-scale fractures and minimize fluid loss thereby minimizing formation damage. It is desirable for proppants of low density to be applied to fracturing fluids; however, the prior art is deficient in the means of producing nano- and micro-proppant of low density.

It would be advantageous to develop a method for producing nano- and micro-particles of low density for use as proppants and as fluid-loss control additives in hydraulic fracturing operations.

SUMMARY

An embodiment of the disclosure is a method for producing a mixture of nano- and micro-particles for use as a proppant and fluid-loss-control additive, comprising: mixing a liquid solvent, at least one surfactant, a particle-forming compound, and at least one curing agent for about 10 minutes to form an emulsion; and incubating the emulsion at about 30-150° C. for about 5 to 200 minutes to permit formation of nano- and micro-particles. In an embodiment, the emulsion is incubated at about 60° C. In an embodiment, the emulsion is incubated for about 60 minutes. In an embodiment, the liquid solvent comprises water, seawater, brine comprising monovalent, divalent, and multivalent salts, an alcohol comprising ethanol, propanol, butanol, or combinations thereof. In an embodiment, the at least one surfactant comprises anionic surfactants, cationic surfactants, nonionic surfactants, amphoteric surfactants or combinations thereof. In an embodiment, the particle-forming compound comprises aliphatic epoxides, anhydrides, glycidyl amine epoxide, cycloaliphatic epoxides, epoxy functional resins, polyurethane resins, phenol-formaldehyde resin, bis-phenol A diglycidyl ether, poly glycidyl ethers, acrylic resin, glycidyl ethers, bis-phenol F diglycidyl ethemovalac resins, or combinations thereof. In an embodiment, the at least one curing agent comprises isophorone diamine, boron tri-fluoride derivatives, imidazolines, mercaptans, hydrazides, polyamides, functional resins, mono ethanol amine, benzyl dimethylamine, lewis acids, tertiary amines, cycloaliphatic amines, amidoamines, aliphatic amines, aromatic amines, isophorone, imidazoles, sulfide, amides or their derivatives. In an embodiment, the method further comprises adding a pH control agent to the emulsion. In an embodiment, the pH control agent comprises sodium hydroxide, potassium hydroxide, calcium hydroxide, or combinations thereof. In an embodiment, the method further comprises adding a viscosity enhancer to the emulsion. In an embodiment, the viscosity enhancer comprises calcium carbonate nanoparticles, silicate nanoparticles, or water-soluble polymers comprising polyacrylamide or polyvinyl alcohol.

An embodiment of the disclosure is a nano- and micro-particle mixture produced from the method above. In an embodiment, the emulsion is incubated at about 60° C. and for about 60 minutes. In an embodiment, the liquid solvent comprises water, seawater, brine comprising monovalent, divalent, and multivalent salts, an alcohol comprising ethanol, propanol, butanol, or combinations thereof; the at least one surfactant comprises anionic surfactants, cationic surfactants, nonionic surfactants, amphoteric surfactants or combinations thereof; the particle-forming compound comprises aliphatic epoxides, anhydrides, glycidyl amine epoxide, cycloaliphatic epoxides, epoxy functional resins, polyurethane resins, phenol-formaldehyde resin, bis-phenol A diglycidyl ether, poly glycidyl ethers, acrylic resin, glycidyl ethers, bis-phenol F diglycidyl ethernovalac resins, or combinations thereof; and the at least one curing agent comprises isophorone diamine, boron tri-fluoride derivatives, imidazolines, mercaptans, hydrazides, polyamides, functional resins, mono ethanol amine, benzyl dimethylamine, lewis acids, tertiary amines, cycloaliphatic amines, amidoamines, aliphatic amines, aromatic amines, isophorone, imidazoles, sulfide, amides or their derivatives. In an embodiment, the mixture further comprises adding a pH control agent to the emulsion; wherein the pH control agent comprises sodium hydroxide, potassium hydroxide, calcium hydroxide, or combinations thereof. In an embodiment, the mixture further comprises adding a viscosity enhancer to the emulsion; wherein the viscosity enhancer comprises calcium carbonate nanoparticles, silicate nanoparticles, or water-soluble polymers comprising polyacrylamide or polyvinyl alcohol. In an embodiment, the diameter of the nanoparticles is less than 1 μm and the diameter of the microparticles is between 1 μm and 100 μm. In an embodiment, the density of the nanoparticles and microparticles is 1.50 g/ml or less.

An embodiment of the disclosure is a method of using the nano- and micro-particles produced from the method above to increase the conductivity of microfractures and minimize fluid loss comprising adding the particles to a pad or fracturing fluids. In an embodiment, nano-, micro-, or a mixture of nano- and micro-particles can be used.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
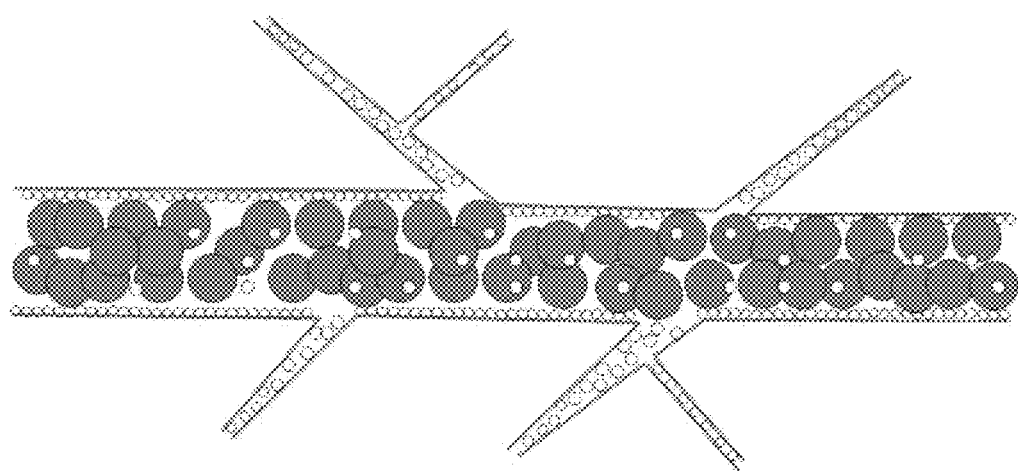
FIG. 1 is an image depicting nano- and micro-particles (NMP) with a primary proppant.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3$^{rd}$ Edition.

Nano- and micro-particles (NMP) can be utilized as proppants to enhance the conductivity of microfractures and fluid-loss-control additives for hydraulic fracturing operations. In an embodiment, nano-, micro-, or a mixture of nano- and micro-particles can be used.

In an embodiment, the NMP are made from an oil/water emulsion. In an embodiment, the emulsion is made by mixing a liquid solvent, at least one surfactant, a particle-forming compound, and at least one curing agent together. The particle-forming compound and the curing agents are mixed together to form the oil phase in the oil/water emulsion. After curing, the "oil" droplets turn into NMP.

In an embodiment, the liquid solvent comprises water, seawater, brine containing monovalent, divalent, and multivalent salts, an alcohol such as ethanol, propanol, butanol, or combinations thereof.

In an embodiment, the surfactant comprises anionic surfactants, cationic surfactants, nonionic surfactants, amphoteric surfactants or combinations thereof.

In an embodiment, the particle-forming compound can be but is not limited to aliphatic epoxides, anhydrides, glycidyl amine epoxide, cycloaliphatic epoxides, epoxy functional resins, polyurethane resins, phenol-formaldehyde resin, bisphenol A diglycidyl ether, poly glycidyl ethers, acrylic resin, glycidyl ethers, bis-phenol F diglycidyl ethernovalac resins, or combinations thereof.

In an embodiment, the curing agent can be but is not limited to isophorone diamine, boron tri-fluoride derivatives, imidazolines, mercaptans, hydrazides, polyamides, functional resins, mono ethanol amine, benzyl dimethylamine, lewis acids, tertiary amines, cycloaliphatic amines, amidoamines, aliphatic amines, aromatic amines, isophorone, imidazoles, sulfide, amides, and their derivatives.

If desired, acid or alkali pH control agents can be added to the liquid solvent. In an embodiment, the pH control agents can be selected from but not limited to mineral acids such as sodium hydroxide, potassium hydroxide, calcium hydroxide, and combinations thereof.

If desired, viscosity enhancers can be added to the liquid solvent. In an embodiment, the viscosity enhancers can be selected from but not limited to nanoparticles such as calcium carbonate nanoparticles and silicate nanoparticles, and water-soluble polymers such as polyacrylamide and polyvinyl alcohol.

In an embodiment, NMP are formed by mixing the liquid solvent, at least one surfactant, a particle-forming compound, and at least one curing agent together for 3-15 minutes to form an oil/water emulsion and then allowed to stand undisturbed in a water bath at 30-150° C. for 5-200 minutes. In an embodiment, they are mixed together for about 10 minutes. In an embodiment, the temperature is 60° C. In an embodiment, the emulsion is allowed to stand in the water bath for 60 minutes. In an embodiment, seawater is used as liquid solvent. In an embodiment, alkali is added to adjust the pH. In an embodiment, the pH is adjusted to at least about 12. This method results in formation of particles across a broad size range from nanoscale to microscale.

The NMP serve multiple functions in hydraulic fracturing operations. In an embodiment, NMP can be added to the pad and/or fracturing fluids to increase the conductivity of nano- and micro-fractures. In an embodiment, NMP are used to complement a primary proppant functioning to keep the main fractures open, as depicted in FIG. 1. In an embodiment, NMP additionally function as a fluid-loss-control additive.

The density of the nanoparticles (diameter<1 μm) and microparticles (diameter≤100 μm) made through the disclosed method is no more than 1.50 g/ml and thus far lower than nano- and micro-particle proppants described in the prior art, for example, silica flour and ceramic microparticle proppants and silicon oxide, calcium oxide, and aluminum oxide nanoparticles produced from fly ash. The low density permits NMP to be transported far in the hydraulic fracture with low settling rate.

In addition, NMP are deformable. This prevents the NMP from being crushed when fractures attempt to close after the injection has stopped and enhances flushing of NMP out of nano- and micro-fractures.

EXAMPLES

Tween™ 20 is a polyoxyethyene (20) sorbitan monolurate with a registered trademark of Croda International plc, containing Alkoxylate.

Hostafrac SF14413 is a product of Clariant Corporation. 10-20% by weight proprietary ingredient 6615, 10-20% by weight ethoxylated isotridecanol, 1-10% proprietary ingredient 6715, 1-5% solvent naphtha, 0.1-1% by weight naphthalene.

Max CLR™ is a trademark of Polymer Composites Corporation.

Max CLR™ A is a modified bisphenol A epoxy resin, 90-100% by weight phenol, 4-(1-methylethylidene) Bis, Polymer with (Chloromethane) Oxerane, 1-5% by weight epoxidize diluent reactive, 0-10% by weight epoxidize cresylgliciderether modified, and 0.1-0.5% by weight non-silicone additive.

Max CLR™ B is an amine modified curing agent. It contains about between 5-15% by weight benzyl alcohol, 15-35% by weight isophoromediamine adduct, and 50-60% by weight aliphatic amine adduct.

Example 1

Figure 2:
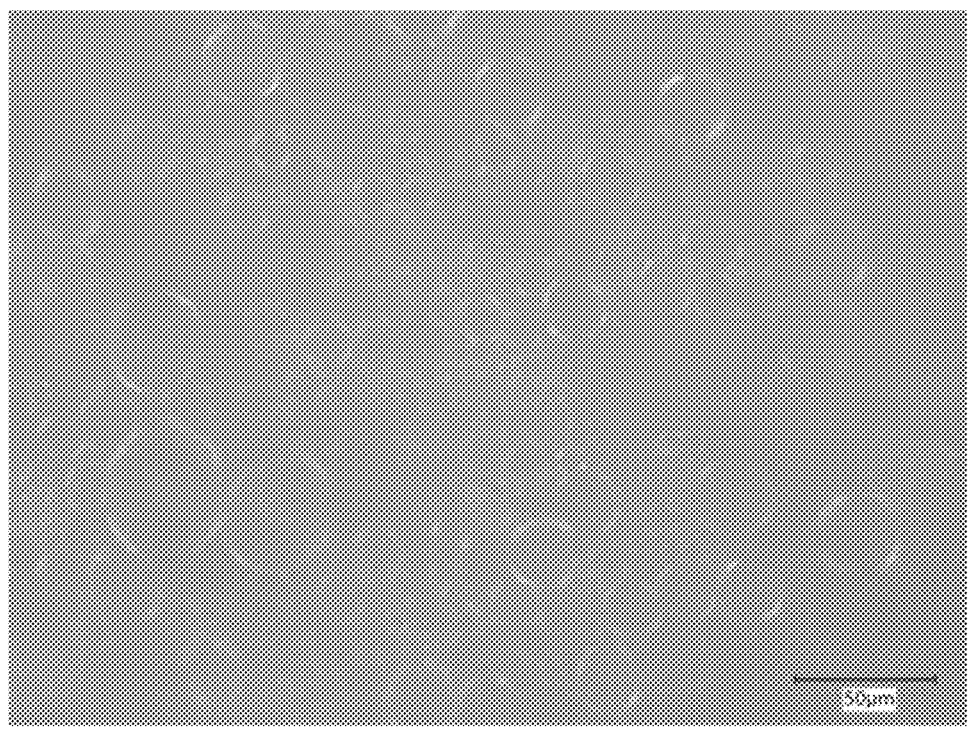
FIG. 2 depicts the nano- and micro-particles (NMP) as formed in Example 1.
Figure 3:
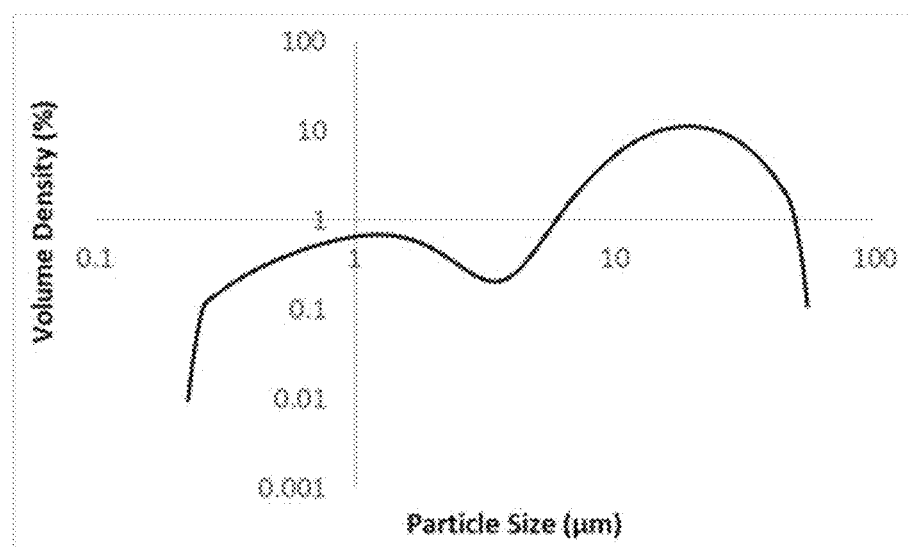
FIG. 3 is a graph depicting the size distribution of nano- and micro-particles (NMP) as formed in Example 1.

The liquid for making the oil/water emulsion to form the NMP is shown in Table 1. Adding pH control agent with a weight percentage of 1.44 wt, obtained a pH of 12.45. The liquid was mixed for 5 minutes to form an emulsion and then allowed to stand undisturbed in water bath at 60° C. for 1 hour to react to form NMP. The NMP formed are shown in FIG. 2. The particle size distribution was determined by Mastersizer 3000 laser particle size analyzer. The size distribution results are shown in FIG. 3. Microparticles were formed having sizes ranging from a diameter of 1 μm to <100 μm. Nanoparticles were formed having sizes of a diameter of <1 μm.

TABLE 1

| Liquid components | Weight (g) | Wt. % |
|---|---|---|
| Tween ™ 20 | 3 | 2.9 |
| Hostafrac SF14413 | 7 | 6.7 |
| Seawater | 31 | 29.7 |
| pH control agent | 1.5 | 1.4 |
| Max CLR ™ A | 31 | 29.7 |
| Max CLR ™ B | 31 | 29.7 |

Example 2

Figure 4:
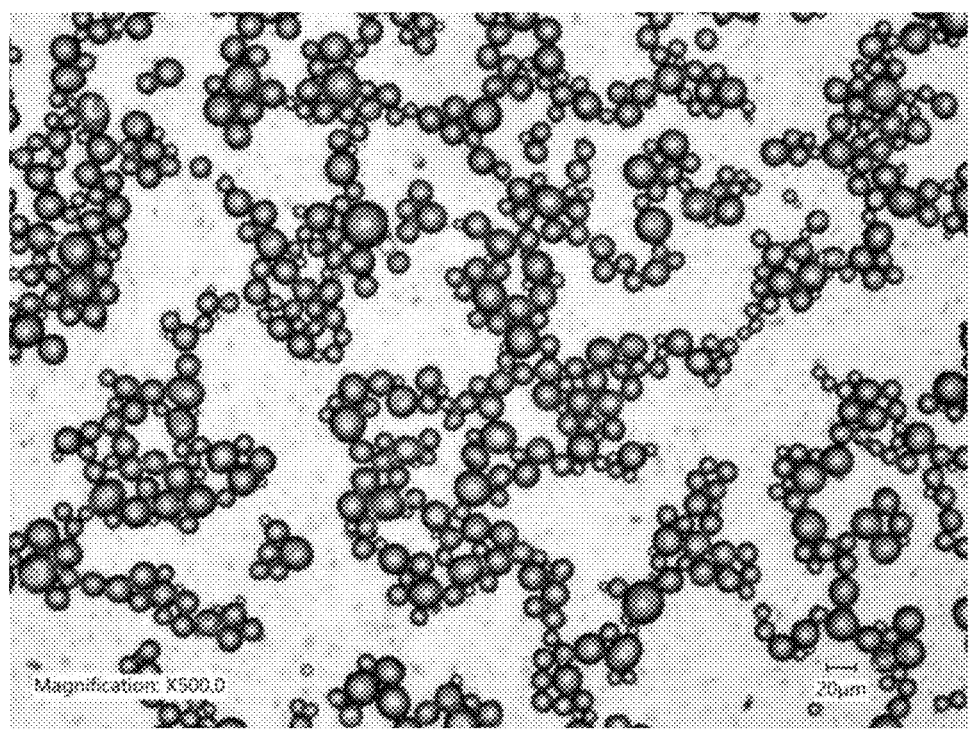
FIG. 4 depicts the nano- and micro-particles (NMP) as formed in Example 2.
Figure 5:
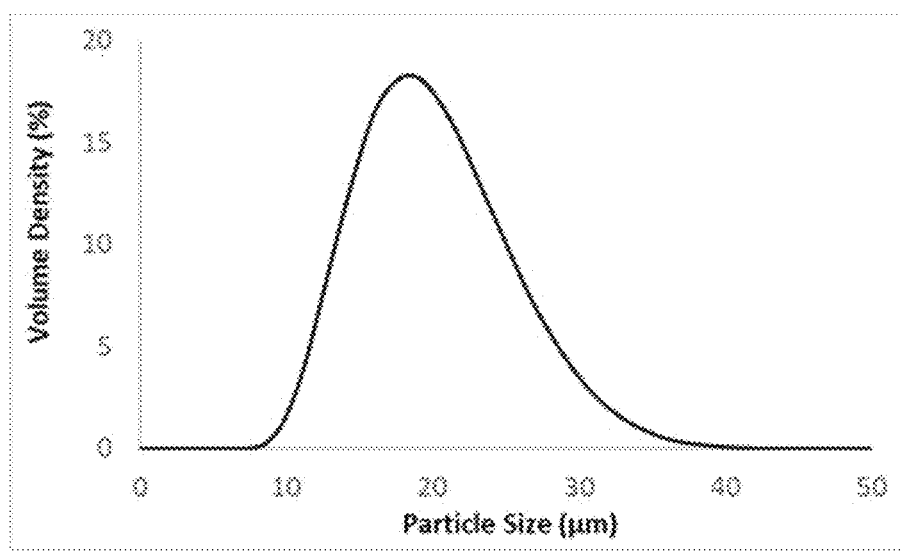
FIG. 5 is a graph depicting the size distribution of nano- and micro-particles (NMP) as formed in Example 2.

The liquid for making the oil/water emulsion to form the NMP is shown in Table 2. The liquid was mixed for 5 minutes to form an emulsion and then allowed to stand undisturbed in a water bath at 60° C. for 1 hour to react to form NMP. The NMP formed are shown in FIG. 4. The size distribution results are shown in FIG. 5. The size of the particles formed is less than 100 μm.

TABLE 2

| Liquid components | Weight (g) | Wt. % |
|---|---|---|
| Tween ™ 20 | 3 | 3.7 |
| Hostafrac SF14334 | 7 | 8.6 |
| Seawater | 30 | 36.8 |
| pH control agent | 1.5 | 1.8 |
| Epoxy embedding medium | 30 | 36.8 |
| Max HTE B | 10 | 12.3 |

Hostafrac SF14334 is a product of Clariant Corporation. <12% by weight "alcohols, C11-14-iso, C13 rich, ethoxylated", <10% by weight polyoxyethylene monobutyl ether, <5% propylene glycol.

Epoxy embedding medium is a product of Sigma-Aldrich. <=100% by weight "1,2,3-Propanetriol, polymer with 2-(chloromethyl)oxirane".

Max HTE B is a product of Polymer Composites, Inc. 30-60% by weight 4,4 Methylenebis(cyclohexylamine), 30-50% by weight 3,3(Oxybis(2, 1 ethane-diloxy))bis 1-propanamine.

Example 3

Figure 6:
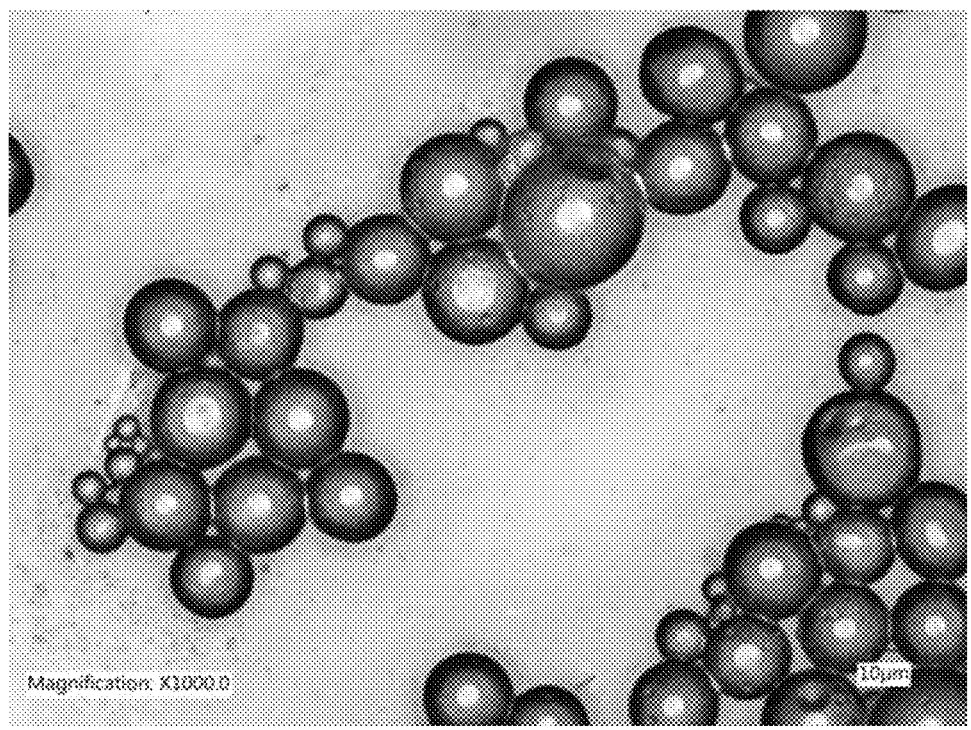
FIG. 6 depicts the nano- and micro-particles (NMP) as formed in Example 3.
Figure 7:
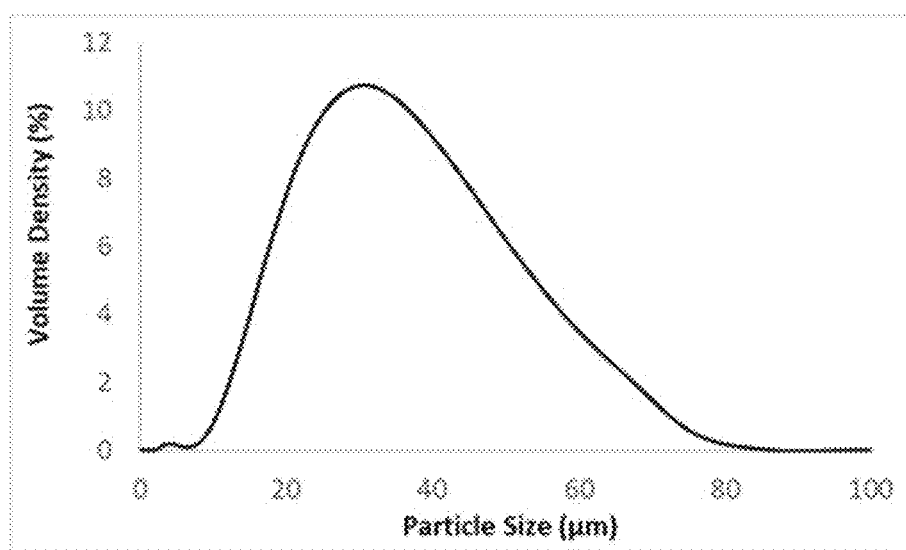
FIG. 7 is a graph depicting the size distribution of nano- and micro-particles (NMP) as formed in Example 3.

The liquid for making the oil/water emulsion to form the NMP is shown in Table 3. The liquid was mixed for 5 minutes to form an emulsion and then allowed to stand undisturbed in a water bath at 60° C. for 1 hour to react to form NMP. The NMP formed are shown in FIG. 6. The size distribution results are shown in FIG. 7. The size of the particles formed is less than 100 μm.

TABLE 3

| Liquid components | Weight (g) | Wt. % |
|---|---|---|
| Tween ™ 20 | 3 | 3.0 |
| Hostafrac SF13213 | 7 | 6.9 |
| Seawater | 30 | 29.6 |
| pH control agent | 1.5 | 1.5 |
| Max 1618 Part A | 30 | 29.6 |
| Max 1618 Part B | 30 | 29.6 |

Hostafrac SF13213 is a product of Clariant Corporation. ⇐50% by weight proprietary ingredients, ⇐15% by weight solvent naphtha, ⇐10% Ethoxylated alcohol.

Max 1618 is a product of Polymer Composites, Inc.

Max 1618 Part A is an epoxy resin, 75-90% by weight modified derivatives of bisphenol a resins, 5-10% by weight modified derivative of cycloaliphatic resin, 1-3% by weight acrylated monomer, and 3-10% by weight glycidyl ether (c12-c14 alkyloxy).

Max 1618 Part B is an amine curing agent, 30-60% by weight epoxy adduct, 30-50% by weight 3,3(oxybis(2, 1 ethane-diloxy))bis 1-propanmine.

Example 4

Figure 8:
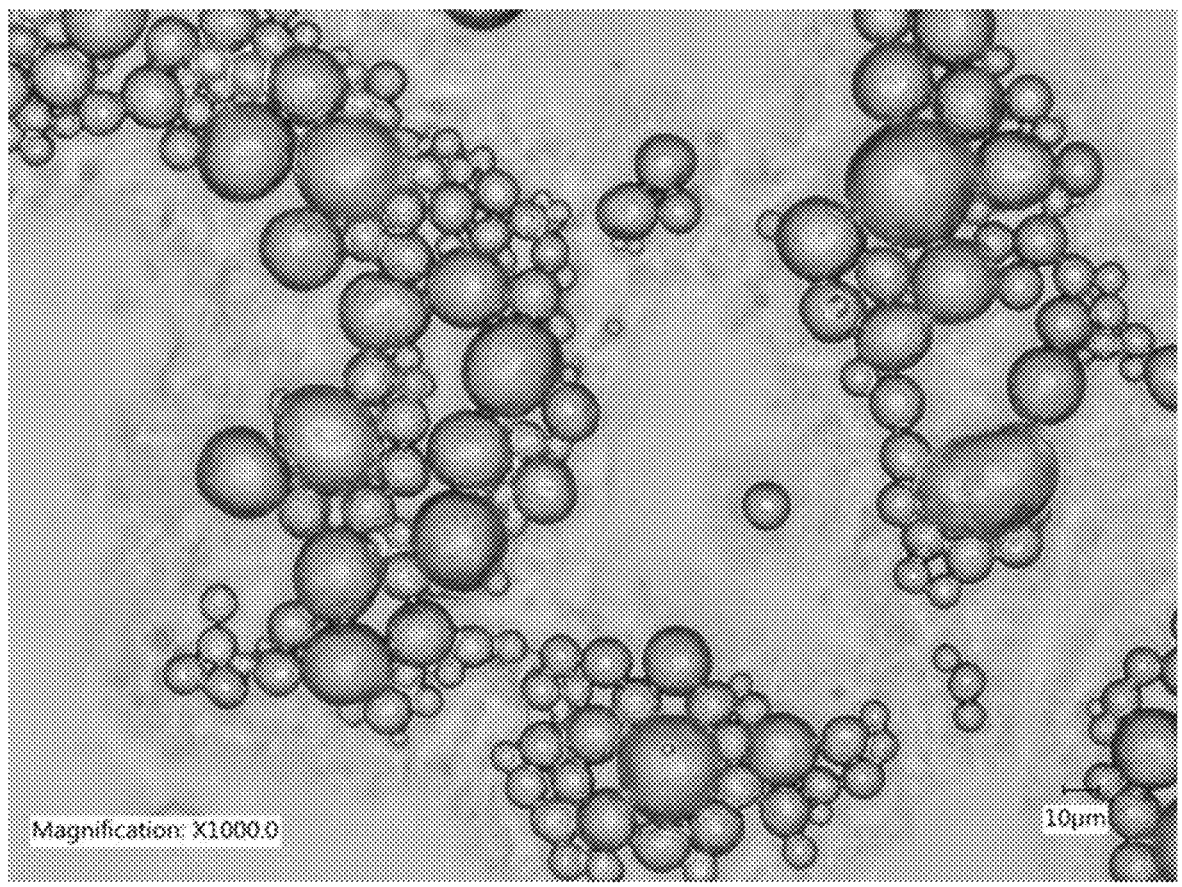
FIG. 8 depicts the nano- and micro-particles (NMP) as formed in Example 4.
Figure 9:
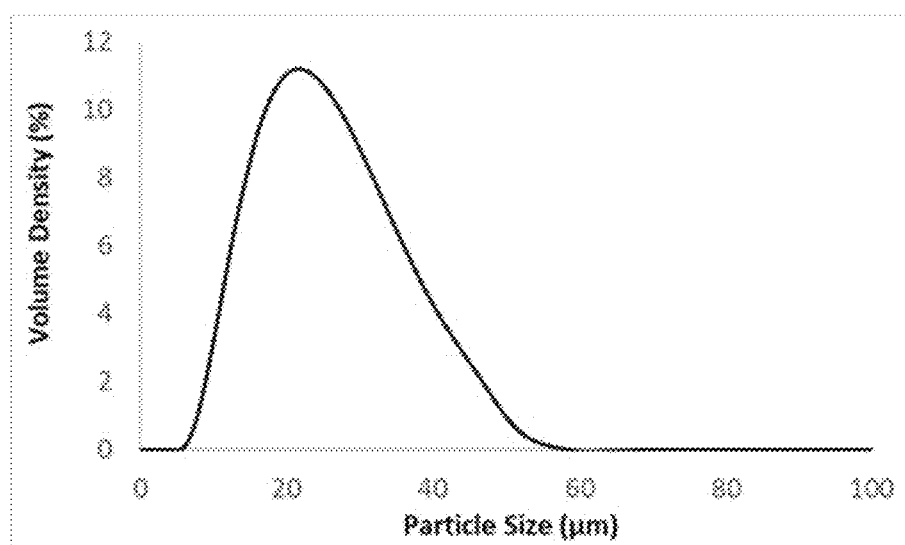
FIG. 9 is a graph depicting the size distribution of nano- and micro-particles (NMP) as formed in Example 4.

The liquid for making the oil/water emulsion to form the NMP is shown in Table 4. The liquid was mixed for 5 minutes to form an emulsion and then allowed to stand undisturbed in a water bath at 60° C. for 1 hour to react to form NMP. The NMP formed are shown in FIG. 8. The size distribution results are shown in FIG. 9. The size of the particles formed is less than 100 μm.

TABLE 4

| Liquid components | Weight (g) | Wt. % |
|---|---|---|
| Tween ™ 20 | 3 | 3.0 |
| Hostafrac SF14334 | 7 | 6.9 |
| Seawater | 30 | 29.6 |
| pH control agent | 1.5 | 1.5 |
| Epoxy embedding medium | 30 | 29.6 |
| Max CLR ™ B | 30 | 29.6 |

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method for producing a mixture of nano- and micro-particles for use as a proppant and fluid-loss-control additive, comprising:
    mixing a liquid solvent, at least one surfactant, a particle-forming compound, and at least one curing agent to form an emulsion, and at least one pH control agent that elevates the pH of the emulsion to at least about 12, wherein the liquid solvent comprises seawater, the seawater comprising more than 32 wt % of the emulsion; and
    incubating the emulsion to permit formation of nano- and micro-particles;
    wherein the mixing of at least the pH control agent and the seawater further functions to ensure uniformity of diameters of the nano- and micro-particles, the diameters of the nano- and micro-particles being under 100 μm for substantially all of the nano- and micro-particles, and wherein the density of the nano-particles and micro-particles is 1.50 g/ml or less.

2. The method of claim 1 wherein the emulsion is incubated at about 30-150° C.

3. The method of claim 1 wherein the emulsion is incubated for about 5-200 minutes.

4. The method of claim 1, wherein the liquid solvent further comprises: water, brine comprising monovalent, divalent, and multivalent salts, an alcohol comprising ethanol, propanol, butanol, or combinations thereof.

5. The method of claim 1, wherein the at least one surfactant comprises anionic surfactants, cationic surfactants, nonionic surfactants, amphoteric surfactants or combinations thereof.

6. The method of claim 1, wherein the particle-forming compound comprises aliphatic epoxides, anhydrides, glycidyl amine epoxide, cycloaliphatic epoxides, epoxy functional resins, polyurethane resins, phenol-formaldehyde resin, bis-phenol A diglycidyl ether, poly glycidyl ethers, acrylic resin, glycidyl ethers, bis-phenol F diglycidyl ether-novalac resins, or combinations thereof.

7. The method of claim 1, wherein the at least one curing agent comprises isophorone diamine, boron tri-fluoride derivatives, imidazolines, mercaptans, hydrazides, polyamides, functional resins, mono ethanol amine, benzyl dimethylamine, lewis acids, tertiary amines, cycloaliphatic amines, amidoamines, aliphatic amines, aromatic amines, isophorone, imidazoles, sulfide, amides or their derivatives.

8. The method of claim 1, wherein the pH control agent comprises sodium hydroxide, potassium hydroxide, or combinations thereof.

9. The method of claim 1, further comprising:
    adding a viscosity enhancer to the emulsion.

10. The method of claim 9, wherein the viscosity enhancer comprises calcium carbonate nanoparticles, silicate nanoparticles, or water-soluble polymers comprising polyacrylamide or polyvinyl alcohol.

* * * * *

UNITED STATES PATENT AND TRADEMARK OFFICE
CERTIFICATE OF CORRECTION

PATENT NO. : 12,241,022 B2
APPLICATION NO. : 17/957364
DATED : March 4, 2025
INVENTOR(S) : Lijun Lin et al.

Page 1 of 1

It is certified that error appears in the above-identified patent and that said Letters Patent is hereby corrected as shown below:

In the Specification

Column 1, Line 5 please add the first heading and paragraph as follows:
--CROSS-REFERENCE TO RELATED APPLICATIONS
This application is a continuation-in-part application of United States Patent Application No. 16/240,597, filed January 4, 2019; which issued as United States Patent No. 11,459,502 on October 4, 2022, the disclosure of which is incorporated herein by reference in its entirety for all intents and purposes.--

Signed and Sealed this
Eighth Day of April, 2025

Coke Morgan Stewart
*Acting Director of the United States Patent and Trademark Office*